Aug. 4, 1959  J. C. KARLSON  2,897,676
GYROSCOPE
Filed May 9, 1956
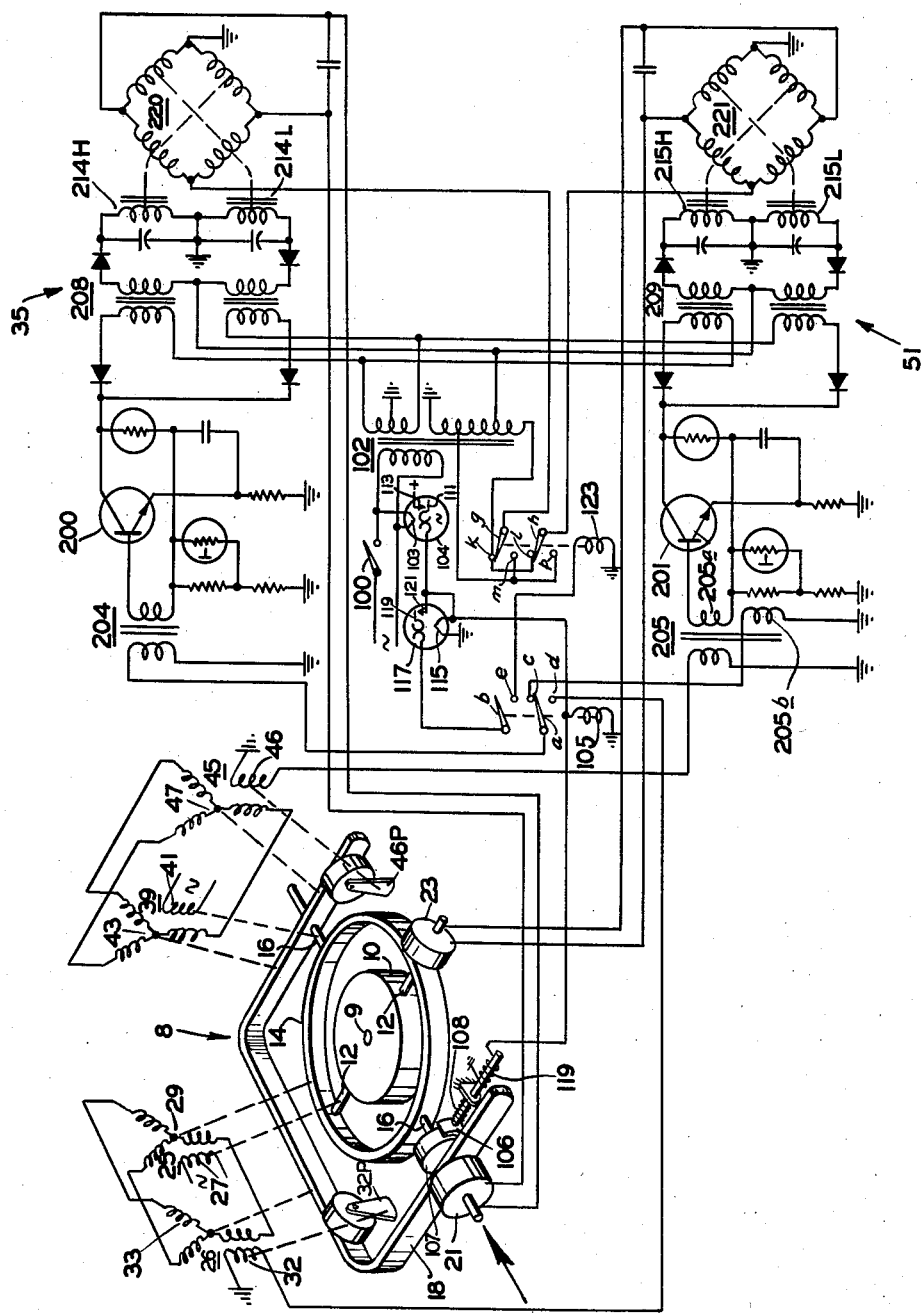
INVENTOR.
JOHN C. KARLSON
BY
Oscar B Brumback
ATTORNEY United States Patent Office 2,897,676
Patented Aug. 4, 1959

2,897,676

GYROSCOPE

John C. Karlson, Brooklyn, N.Y., assignor to Bendix Aviation Corporation, Teterboro, N.J., a corporation of Delaware Application May 9, 1956, Serial No. 583,758

8 Claims. (Cl. 74—5.41)

This invention relates generally to gyroscopes and more particularly to a system for rapidly erecting a gyroscope.

When a vertical gyroscope is de-energized it usually comes to rest with its spin axis in a position other than the true vertical. If the gyroscope be energized while at this rest position, the spin axis will revolve about the true vertical and, tracing a cone in space, gradually move to the vertical position. This takes a considerable period of time, however, and the time required for the vertical gyroscope of an aircraft or missile to move to an erect position must be kept at a minimum. Also, as the gyroscope approaches the erect condition before it has attained a proper speed, the gyroscope is subject to mutation.

An object of the present invention, therefore, is to provide a novel system for rapidly erecting a gyroscope.

Another object is to provide a novel system for rapidly erecting a gyroscope by driving the spin axis off from the centered position about one axis until it has been erected about another axis.

Another object is to provide a novel system for rapidly erecting a vertical gyroscope by cross feeding a bank error signal to the pitch erection mechanism as well as to the bank erection mechanism for a predetermined period of time so as to provide additional torque in a proper direction for rapidly erecting the gyroscope.

A further object is to provide a novel system for rapidly erecting a gyroscope by positioning the spin axis so that the counter-torque due to the rotation of the rotor will aid in erecting the gyroscope about another axis.

Another object is to erect a gyroscope rapidly by restraining or damping the movement of the gyroscope about a first axis while the spin axis is moved about a second axis toward a position parallel to the normal position of the damped axis so that the reaction of the spin axis will aid in the movement of the gyroscope about the first axis to its normal position, and thereafter erecting the gyroscope about the second axis.

A further object is to provide a novel system for erecting a gyroscope rapidly by applying for an initial predetermined period of time an excitation to the torque means for the gyro that is greater than the excitation applied thereafter.

The novel erection system contemplated by the present invention damps the movement of the gyro about a first axis for a first predetermined time interval while the rotor is gaining speed and while the gyroscope is being moved about a second axis so the spin axis will tend to be parallel with the first axis whereby the counter-torque due to the spinning of the rotor will aid in the erection about the first axis and subsequently erecting the gyroscope with respect to the second axis, and thereafter changing the erection rate, the erection being at greater rate initially for a predetermined time interval than it is thereafter.

The attainment of the above and other objects will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not intended as a definition of the limits of the invention.

The single sheet of drawing illustrates schematically a vertical seeking gyroscope system constructed according to the invention.

Referring to the drawing, a gyro vertical 8 is illustrated as comprising a rotor (not shown) mounted for spinning in a clockwise direction about a normally vertical axis 9 in a rotor bearing support or case 10 which is mounted by way of trunnions 12 in a gimbal ring 14 that is mounted by trunnions 16 in a support or casing 18. Casing 18 is rigid with the craft on which the gyroscope is mounted and casing 10 is rotatable about mutually horizontal axes relative to casing 18.

The principal characteristic of a gyroscope is inertia. When the rotor is spinning at high speed, spin axis 9 will maintain a fixed position in space regardless of the motions of its supporting casing 18. To establish a true vertical reference, however, spin axis 9 must be forced to remain upright relative to the earth's surface and not relative to space. This is accomplished by an erection system including pitch and bank precessing motors 21 and 23.

Precessing motors 21 and 23 apply forces or torques to the gyro to cause the spin axis to precess, i.e., to move in accordance with the force. As is well known in the art, this torque must be applied to the gyro in a direction perpendicular to the direction in which it is desired to precess the spin axis of the rotor. Thus, the axis of the pitch precessing motor 21 extends fore and aft of the craft, that is, on the bank axis of the gyroscope; and the axis of the bank precessing motor 23 extends transversely of the craft, that is, on the pitch axis of the gyroscope.

Normally, the gyroscope is precessed about the pitch axis in response to the output of inductive transmitter and receiver devices 25 and 26 which provide motor 21 with signals corresponding to the error of the spin axis from the vertical with respect to the earth's surface along the pitch axis. To this end, inductive transmitter device 25 has its stator 29 mechanically connected to gimbal 14 of the gyroscope and has its rotor winding 27 mechanically connected by way of trunnion 12 to case 10 coaxially with the pitch axis of the gyroscope. Inductive receiver device 26 on the other hand has its rotor 32 movable by a pendulum 32P swinging lengthwise of the craft and a stator winding 33 electrically connected to stator winding 29 and mechanically connected to casing 18. Thus the position of rotor 27 relative to stator 29 is a function of the relative attitude of the craft and gyroscopic rotor about the pitch axis, and the position of rotor 32 relative to stator 33 is a function of the attitude of the craft about the pitch axis relative to the dynamic vertical. The signal from inductive receiver device 26 corresponds to the relative displacements of rotors 27 and 32 and is a function of the angle between the gyroscope's spin axis and the dynamic vertical about the pitch axis. This signal through an amplifier 35 normally operates motor 21 to precess the gyroscope about the pitch axis.

The gyroscope is precessed about its bank axis by an arrangement similar to that described above for precessing the gyroscope about its pitch axis. An inductive transmitter device 39 has its rotor 41 mechanically connected to gimbal 14 by way of trunnion 16 coaxially with the bank axis of the gyro and has its stator winding 43 mechanically connected to casing 18. Inductive receiver device 45 on the other hand has a motor 46 connected with a pendulum 46P swinging transversely of the craft and a stator winding 47 electrically connected to stator 43 and mechanically connected to casing 18. Thus, the relative position of rotor 41 and stator 43 is a function of the relative attitude of the craft and gyroscope about the bank axis, and the relative position of rotor 46 and stator 47 is a function of the attitude of the craft about the bank axis relative to the dynamic vertical. The signal from inductive receiver device 45 corresponds to the relative displacements of rotors 41 and 46 and is a function of the angle between the gyroscope's spin axis and the dynamic vertical about the bank axis. This signal applied to an amplifier 51 operates motor 23 to precess the gyro about its bank axis.

Amplifiers 35 and 51 may be identical. In the embodiment herein, each contains a transistor 200, 201 for receiving the erection signal by way of a coupling transformer 204, 205 and operating in response thereto. The output of the transistor drives a high speed torroidal magnetic amplifier 208, 209 to provide a differential direct current output whose sense and magnitude depend upon the phase and amplitude of the input signal to the coupling transformer. The latter output is applied to a normally balanced bridge type magnetic amplifier 220, 221 whose opposite arms is indicated by the broken lines have their impedance changed by the D.C. flux due to the direct current output of amplifier 208, 209. The bridge output operates the precessing motor 21, 23. Reference is made to my copending application Serial No. 473,326 for the details of the transistor pre-amplifier 200, 201 and high speed magnetic amplifier 208, 209, and to copending application Serial No. 346,234 now U.S. Patent No. 2,769,122, granted October 30, 1956, to Harold Moreines et al. and assigned to Bendix Aviation Corporation, for the details of the magnetic amplifier 220, 221. For a given unbalance of the bridge amplifier, the output depends upon the value of the excitation applied to the bridge.

The foregoing erection system is conventional and, once the gyro has been placed into operation and the spin axis brought to a vertical position, operates to maintain the spin axis in a vertical relationship to the earth as the craft moves over the surface of the earth. However, when the gyro is initially placed into operation, considerable length of time is required for the erection system to bring the gyro axis to a vertical position. The present invention improves the system so as to rapidly erect the gyro. Further, as the spin axis approaches the vertical before it has reached a proper speed, the gyro is subjected to nutation or violent oscillation about the vertical.

In accordance with the present invention the signal from the bank error signal device 45 is applied to both the bank and pitch erection systems during the early stages of the initial erection. The amplified signal is applied to the pitch precessing motor 21 in a direction to rotate gimbal 14 so that trunnions 12 lie in a normal horizontal plane. The amplified signal also is applied to the bank precessing motor 23 in a direction to rotate the gyro about pitch trunnions 12 to align the spin axis 9 with the roll trunnions 16. However, because of the use of conventional stops for preventing tumbling, the spin axis is prevented from absolute alignment with the roll trunnions 16 and stops a few degrees short of alignment. The signals are applied to the pitch and bank precessing motors 21, 23 so as to rotate the motors in the same directions, either clockwise or counterclockwise, as determined by the sense of the bank error signal. With this arrangement the gyro is erected towards vertical about the roll axis trunnions 16 and is moved away from vertical about the pitch trunnions 12. The counter acceleration forces of the rotor aid to the forces exerted by the pitch motor 21 and more rapidly moves the pitch trunnions 12 to a horizontal position. As the rotor continues to increase in speed the gyroscopic forces due to rotation of the gyro about trunnions 16 act in opposition to the force exerted by bank motor 23 and the spin axis of the gyro gradually moves towards the vertical and these opposing forces prevent nutation. The time delay switch 104 operates after about approximately fifteen seconds and disconnects the bank signal of the device 46 from the pitch motor 21 and connects the pitch signal of the device 32 to the pitch motor 21 in the normal manner. The gyroscopic force then moves the spin axis to the vertical.

In accordance with the present invention, the closing of a switch 100 (by conventional means not shown) provides energization to the gyro for turning the rotor, to the erection motors, to the inductive devices, to the amplifiers, and at the same time to transformer 102, and to the heater 103 of a conventional time delay device 104. Solenoid relay 105 is de-energized at this time and its armatures a and b are in the position shown.

The signal from the bank receiver rotor 45 by way of the secondary winding 205a of transformer 205 operates bank erection motor 23 to cause the gyroscope to rotate about its trunnions 16 to bring the gyro to a vertical position relative to the roll axis. The drag of a brake shoe 106 on drum 107 exerted by spring 108 damps the action of the gyroscope about trunnion 16. The signal from the secondary winding 205b of transformer 205 is applied to by way of contact C and armature A to the input transformer 204 of pitch amplifier 35. The resulting output of amplifier 35 drives the spin axis away from center to prevent nutation. In the operation of the device, it should be noted that it is during the initial erection period, of for example, fifteen seconds, that important operating characteristics occur.

Referring then to the drawing, it may be assumed that initially the bank gimbal 14 has been displaced to some point away from vertical whereupon the error signal from pendulum synchro 46 is applied to transformer 205 of bank amplifier 51. A voltage induced in winding 205 B of transformer 205 is applied to the pitch amplifier 35 input transformer 204 through contacts C and A of relay 105. The sense of the signal from synchro 46 is such that the pitch erector motor 21 would drive the bank gimbal 14 in a counterclockwise direction and this same signal applied to bank amplifier 51 and erector motor 23 would rotate the pitch axis 12 in a counterclockwise direction. Spin axis 9 being then parallel with bank axis 16 would transmit a "reaction torque" to bank axis 16 aiding the pitch erection motor 21 against the brake 106. Rotation of the bank axis 16 in the counterclockwise direction would tend to bring about the erection to vertical of spin axis 9 as the gyro motor increases in speed but this effect is opposed by the erection motor 23 and a compromise position will result. This last effect has a definite braking action upon the pitch axis 12 and is effective in reducing nutation. Should the error signal from synchro 46 be such that the bank axis 16 would rotate in a clockwise direction when the erection motor 23 would also rotate in a clockwise fashion bringing the spin axis 9 and the bank axis 16 again into line so that the "reaction torque" would aid the recovery of the bank axis 16 to vertical.

After the initial erection period has elapsed, the operation of relay 105 would connect synchro signals 32 (pitch error) and 46 to their respective amplifiers. The pitch error signal is not used at any time during the initial erection period.

However, at the end of a predetermined time which is determined as being the time required to erect the gyroscope about the bank axis from an attitude furthermost from erect, such as, for example, 15 seconds, element 111 of time delay device 104 engages contact 113. This engagement energizes the heater 115 of a second time delay device 117 to place the time delay device into operation, energizes solenoid 119 to remove the damping by releasing shoe 106 from drum 107 against the action of spring 108, and energizes the solenoid relay 105 to remove the cross feed from bank to pitch.

The energization of relay 105 engages armature A with contact d and the signal from the pitch receiver rotor 32, applied through the pitch amplifier 35 to the pitch torquer motor 21, brings the gyro axis to a vertical position relative to the pitch axis.

After a predetermined time, such as 45 seconds after the energization of time delay device 117, element 119 of this time delay device engages contact 121. This engagement energizes relay 123 by way of armature b and contact e to shift the armatures g, h by which voltage is applied to the balanced bridge magnetic amplifiers 220, 221 from the high voltage levels of contacts k, l to the low voltage levels of contacts m, p. The torque applied to precess the gyroscope for a given error signal is varied in this manner to permit the gyroscope to be subjected to a large torque initially to bring the gyro to a normal vertical at a rapid rate and thereafter to be subjected to a small torque so that the gyro will be moved at a slower rate to integrate the deviations from the dynamic vertical rather than follow the dynamic vertical as would be the case if a continued rapid rate of precession were to be used at all times.

The foregoing has presented a vertical gyro, which is rapidly brought to a vertical condition and thereafter maintained at the vertical condition. By damping the gyroscope against movement about the bank axis for a predetermined time while the gyroscope is being erected about the bank axis and the spin axis is being tilted toward the horizon, use is made of the reaction of the gyro to the rapid rotation of the rotor to erect the gyro with respect to the bank axis, and subsequently erect the gyro with respect to the pitch axis. Thereafter the rate of erection is slowed to integrate the deviations of the gyroscope from vertical.

A simplified version of the sequence of operation of the system is as follows:

a. Upon the closing of switch 100 the gyro motor, the pitch and bank erection means and the proper time delay relay 104 are excited at the same instant, the brake 106 being in the applied position.

b. Relay 105 is in the normally deenergized position so that a portion of the bank error signal is applied to the pitch amplifier.

c. Relay 123 is also in a deenergized position so that a high starting voltage is applied to the balanced bridge amplifiers 220 and 221 and a maximum torque is exerted by the erection motors 21 and 23.

d. Sensing the phase angle of the applied signal the gyro motor would assume a position away from vertical as dictated by the erection motor 23. This position would coincide with the direction in which the bank gimbal 14 was being driven to vertcial.

e. The gyro motor spin axis 9 being then almost parallel to the axis 16 of the bank gimbal 14 would exert a counter starting torque aiding the erection of the bank gimbal 14 (against the restraint of brake 106).

f. After a period of approximately 15 seconds has elapsed the time delay relay 104 will close whereupon brake 106 will be released and relay 105 will be actuated bringing the pitch gimbal 10 to vertical.

g. After a period of approximately 45 seconds time delay relay 117 will close whereupon relay 123 will operate introducing the normal rate of erection in both axes.

h. The function of the brake 106 in addition to the forces brought about by the initial signal configuration tend to minimize nutation.

Although only one embodiment of the invention has been illustrated and described in detail, it is to be expressly understood the invention is not limited thereto. Various changes can be made in the design and arrangement of the parts without departing from the spirit and scope of the invention as will now be understood by those skilled in the art.

What is claimed is:

1. A system for erecting a gyro vertical about the bank and pitch axes comprising bank and pitch signal devices, bank and pitch erection means, and means for operating said bank and pitch erection means simultaineously from said bank signal means for an initial predetermined period of time and thereafter operating said bank erection means from said bank signal means and said pitch erection means from said pitch signal means.

2. A system for initially erecting a gyro vertical about the bank and pitch axes comprising means for erecting the gyroscope about the bank axis, means for damping the movement of the gyroscope about the bank axis while the rotor is gathering momentum, means for moving said gyro spin axis toward a position parallel with the bank axis, whereby nutation is prevented and whereby the reaction of the gyro about the bank axis to rotation about the spin axis aids the movement of said gyro to an erect position about the bank axis, and means subsequently operative for erecting said gyro about the pitch axis.

3. A system for erecting a gyro vertical about the bank and pitch axes comprising bank and pitch signal devices, bank and pitch erection means for precessing the gyro about the bank and pitch axes, means for damping the movement of the gyro about the bank axis, and means for operating said bank and pitch erection means simultaneously from said bank signal means for an initial predetermined period of time and time delay means thereafter effective for releasing the means for damping the movement of the gyro about the bank axis while simultaneously effecting operation of the bank erection means from said bank signal means and said pitch erection means from said pitch signal means.

4. A system for erecting a gyro vertical about the bank and pitch axes comprising bank and pitch signal devices, bank and pitch erection means, means for operating said pitch and bank erection means from said bank signal means for an initial first predetermined period of time and thereafter operating said bank erection means from said bank signal means and said pitch erection means from said pitch signal means, and means for changing the rate of operation of said erection means after a second predetermined period of time.

5. A system for initially erecting a gyro vertical about bank an dpitch axes comprising brake means for damping the movement of said gyroscope about the bank axes while the rotor is gaining speed, means for moving said gyro spin axis toward a position parallel with the bank axis while erecting said gyro about the bank axis, whereby the reaction of the gyro about the bank axis due to rotation about the spin axis tends to move the gyro to a vertical position with respect to the bank axis, and means rendered operaive after a predetermined time for releasing said brake and erecting said gyro about the pitch axis.

6. A system for rapidly erecting the spin axis of a gyro with respect to bank and pitch axes comprising bank and pitch signal means for developing signals corresponding to the deviation of the spin axis from vertical with respect to the bank and pitch axes, bank and pitch erection means, means for initially damping the movement of the gyro and about the roll axis and cross-feeding the signal from the bank signal device to the pitch erection means, whereby the spin axis tends to align itself with the roll axis, and means operative after a predetermined period of time for releasing said damping and operating said bank and pitch erection means from said bank and pitch signal means.

7. A system for rapidly erecting the spin axis of a gyro with respect to bank and pitch axes comprising bank and pitch signal means for developing signals corresponding to the deviation of the spin axis from vertical with respect to the bank and pitch axes, bank and pitch erection means, means for initially cross-feeding the signal from the bank signal device to the pitch erection means, whereby the spin axis tends to align itself with the bank axis, and means operative after a predetermined period of time for operating said bank and pitch erection means from said bank and pitch signal means respectively, and means operative after a second predetermined interval of time for changing the rate of operation of said bank and pitch erection means.

8. A system for initially erecting the spin axis of a gyroscope comprising means for rotating the rotor of said gyroscope about said spin axis, said rotor inherently requiring a period of time to reach a desired rate of rotation and being subject to nutation, means for preventing nutation including means for driving said spin axis away from an erection position about a first axis while erecting said spin axis about a second axis and means for damping the erection about said second axis, and means operative after a predetermined time for erecting said spin axis about said first axis.

References Cited in the file of this patent

UNITED STATES PATENTS

| | | |
|---|---|---|
| 2,524,553 | Wendt | Oct. 3, 1950 |
| 2,542,975 | Adkins | Feb. 27, 1951 |
| 2,589,874 | Seliger | Mar. 18, 1952 |
| 2,605,641 | Barkalow | Aug. 5, 1952 |
| 2,608,099 | Roush | Aug. 26, 1952 |
| 2,720,116 | Furst | Oct. 11, 1955 |
| 2,741,922 | Nolan et al. | Apr. 17, 1956 |

UNITED STATES PATENT OFFICE
CERTIFICATE OF CORRECTION

Patent No. 2,897,676                                                    August 4, 1959

John C. Karlson

It is hereby certified that error appears in the printed specification of the above numbered patent requiring correction and that the said Letters Patent should read as corrected below.

Column 2, line 69, for "motor" read -- rotor --; column 3, line 23, for "is indicated" read -- as indicated --; line 26, before "bridge" insert -- unbalance --; line 28, for "473,326" read -- 479,326 --; line 70, for "aid to" read -- add to --; column 4, line 25, strike out "to", first occurrence; column 6, line 47, for "an dpitch" read -- and pitch --; line 64, strike out "and", first occurrence.

Signed and sealed this 26th day of January 1960.

(SEAL)
Attest:

KARL H. AXLINE
Attesting Officer

ROBERT C. WATSON
Commissioner of Patents